US011604601B2

(12) United States Patent
Kientz et al.

(10) Patent No.: US 11,604,601 B2
(45) Date of Patent: Mar. 14, 2023

(54) TRIM VALUE LOADING MANAGEMENT IN A MEMORY SUB-SYSTEM

(71) Applicant: Micron Technology, Inc., Boise, ID (US)

(72) Inventors: Steven Michael Kientz, Westminster, CO (US); Vamsi Pavan Rayaprolu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/068,327

(22) Filed: Oct. 12, 2020

(65) Prior Publication Data
US 2022/0113890 A1  Apr. 14, 2022

(51) Int. Cl.
*G06F 3/06* (2006.01)

(52) U.S. Cl.
CPC .......... *G06F 3/0655* (2013.01); *G06F 3/0625* (2013.01); *G06F 3/0679* (2013.01)

(58) Field of Classification Search
CPC ..... G11C 16/32; G06F 3/0679; G06F 3/0625; G06F 3/0655; G06F 12/0246; G06F 2212/1016; G06F 2212/1032; G06F 2212/7206; G06F 2212/7208; G06F 3/061; G06F 3/0632; G06F 3/0673
USPC .................................. 711/154, 103
See application file for complete search history.

(56) References Cited

U.S. PATENT DOCUMENTS

| 2014/0181426 | A1* | 6/2014 | Grunzke | G11C 29/028 711/154 |
| 2014/0281808 | A1* | 9/2014 | Lam | G11C 16/26 714/764 |
| 2015/0234603 | A1* | 8/2015 | Kitagawa | G11C 29/28 711/103 |
| 2017/0194053 | A1* | 7/2017 | Micheloni | G11C 5/005 |
| 2018/0373643 | A1* | 12/2018 | Chung | G06F 12/0246 |
| 2019/0361625 | A1* | 11/2019 | Eliash | G06F 3/0604 |
| 2020/0394135 | A1* | 12/2020 | Thiruvengadam | G11C 29/028 |

\* cited by examiner

*Primary Examiner* — Hashem Farrokh
(74) *Attorney, Agent, or Firm* — Lowenstein Sandler LLP (57) ABSTRACT

A memory sub-system to, in response to a power up, initiate a first loading process associated with a set of trim values, wherein the first loading process includes loading a sequence of the set of trim values to one or more registers of the memory sub-system. An operation associated with a memory unit of the memory sub-system is identified. A portion of the set of trim values corresponding to the operation associated with the memory unit is identified. The memory sub-system executes a second loading process comprising loading the portion of the set of trim values corresponding to the operation associated with the memory unit. The operation is executed using the portion of the set of trim values loaded into the one or more registers associated with the memory unit.

18 Claims, 6 Drawing Sheets

TRIM VALUE LOADING MANAGEMENT IN A MEMORY SUB-SYSTEM

TECHNICAL FIELD

Embodiments of the disclosure are generally related to memory sub-systems, and more specifically, are related to trim value loading management in a memory sub-system.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

DETAILED DESCRIPTION

Aspects of the present disclosure are directed to trim value loading management in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information.

Data operations can be performed by the memory sub-system. The data operations can be host-initiated operations or memory sub-system-initiation operations. For example, the host system can initiate a data operation (e.g., write, read, erase, etc.) on a memory sub-system. The host system can send access requests (e.g., program command, read command) to the memory sub-system, such as to store data on a memory device at the memory sub-system and to read data from the memory device on the memory sub-system. In another example, the memory sub-system can initiate an operation such as a temperature compensation operation, an error recovery operation, etc.

Execution of the operations associated with a memory die requires the use of values stored in a register on the memory die that can be adjusted or tuned to modify a behavior of the memory die (herein referred to as "trims" or "trim values"). The trim values need to be set properly prior to execution of the corresponding operation to achieve optimal bit error rate (BER) levels. Accordingly, to enable BER-optimized execution of an operation associated with a memory die, the memory sub-system loads a set of trim values associated with the operation from a data store (e.g., a non-volatile memory) to storage (e.g., a register) of the memory die.

Various algorithms and corresponding operations performed by the memory sub-system (e.g., continuous read level calibration operations, temperature compensation operations, program targeting operations, block family error avoidance operations) actively set and tune these trim values for optimal performance.

To enable the processing of operation requests with optimized error rates, conventional systems load all of the trim values (e.g., a large number of trims of greater than 1,000 trims) before processing a host-initiated operation. However, this loading approach causes delays and prevents the memory sub-system from satisfying applicable time-to-ready (TTR) requirements. In some conventional systems, during resyncing (e.g., the loading or re-loading of trim values following a power up event of a power cycle), all trim values are loaded in a sequential manner. However, this brute force approach to loading all trims sequentially at one time following a power up event leads to delays in the TTR after power on and a negative quality of service impact during the processing of operations.

Aspects of the present disclosure address the above-identified and other deficiencies by implementing a memory sub-system that determines a set of trims that are to be loaded to execute a requested operation. In an embodiment, the memory sub-system can maintain one or more data structures (e.g., one or more tables) in a data store that identify sets of trim values that correspond to respective operations associated with the memory device. In an embodiment, in response to a power up event, the memory sub-system initiates a first loading process wherein trim values maintained in one or more data structures stored in a data store of the memory sub-system (e.g., a non-volatile memory) are loaded in a sequential manner.

In response to an operation request (e.g., a read operation request, a program operation request, a temperature compensation request, etc.) associated with a memory die, the memory sub-system interrupts the first loading process, uses the one or more data structures to identify a set of trim values associated with the requested operation (e.g., a set of trim value that need to be loaded to a register of the memory die to execute the operation), and initiates a loading of the identified set of trim values corresponding to the requested operation. In an embodiment, following the loading of the trim values corresponding to the requested operation, the memory sub-system can return to the sequential loading process (e.g., at a point in the sequence at which the sequential loading process was interrupted). The memory sub-system can interrupt the sequential loading process at any time in response to a new operation request, and initiate a corresponding loading process of the trim values associated with the newly requested operation. In an embodiment, when the memory sub-system returns to an idle state (e.g., following the completion of all requested operations), the memory sub-system can continue with the loading of any unloaded trim values (e.g., trim values that have not been previously loaded as part of either the sequential loading process or in response to a requested operation).

Advantageously, the memory sub-system can respond to an operation request by loading a particular set of trims associated with the requested operation, thereby decreasing the TTR while ensuring the necessary trims are correct for the requested operation. Furthermore, the identification of operation-related trims enables the memory sub-system to initiate the loading of particular trim values in response to a requested operation. The tracking of previously loaded trim values further enables the memory sub-system to continue loading the unloaded trims when in the idle state. Therefore, advantages of the systems and methods implemented in accordance with some aspects of the present disclosure include, but are not limited to, improving TTR and quality of service levels by maintaining information (e.g., metadata) identifying sets of trim values corresponding to respective operations for use in loading an identified set of trim values in response to a requested operation, as described in more detail herein below.

Figure 1:
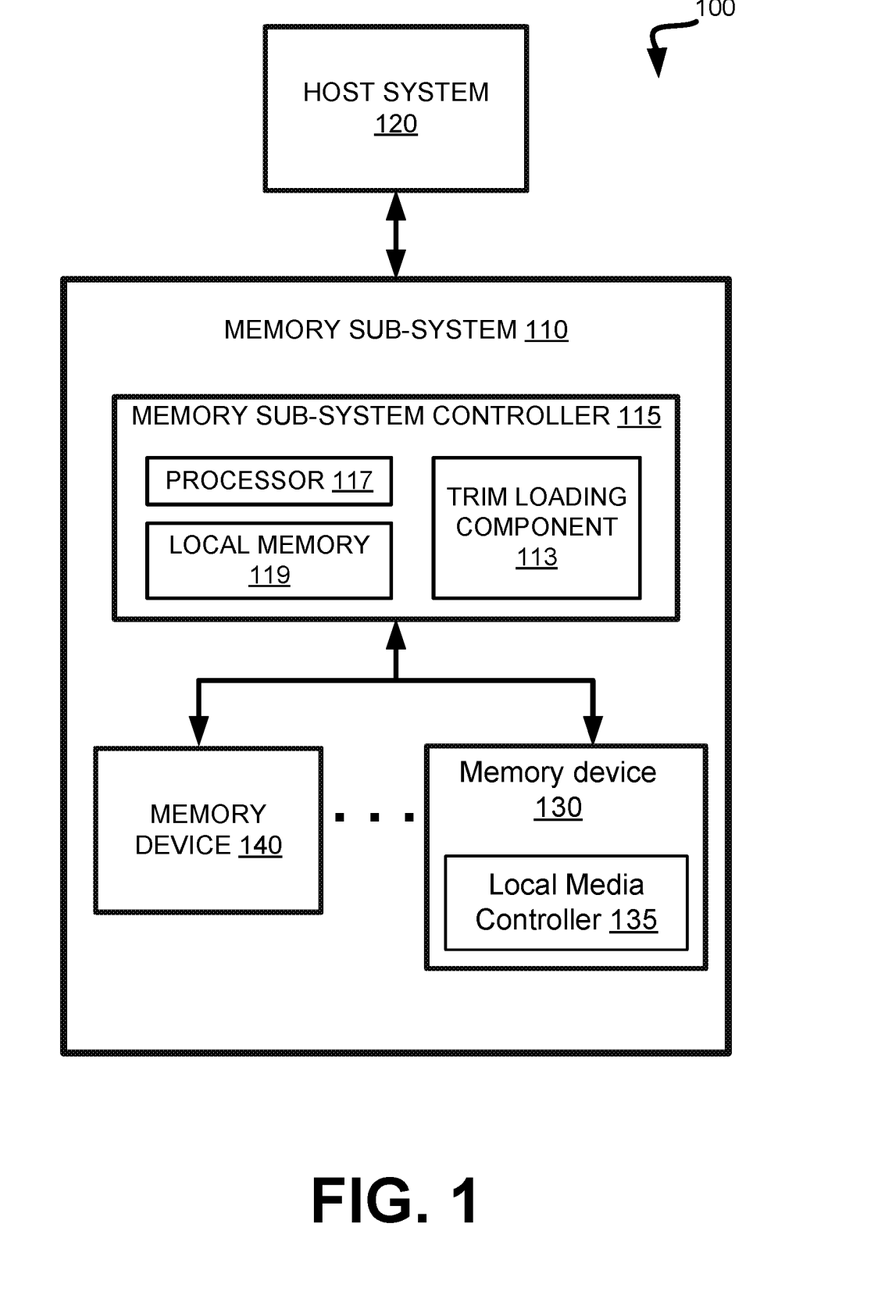
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical block address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a trim loading component 113 that can be used to manage the loading of trim values for processing operations associated with a memory device 130, 140, in accordance with embodiments of the present disclosure. In some embodiments, the controller 115 includes at least a portion of the trim loading component 113. For example, the controller 115 can include a processor 117 (processing device) configured to execute instructions stored in local memory 119 for performing the operations described herein. In some embodiments, the trim loading component 113 is part of the host system 120, an application, or an operating system. The trim loading component 113 can maintain one or more data structures storing information identifying multiple sets of trim values corresponding to respective operations. In response to a power on event, the trim loading component 113 can initiate a loading process including a sequential loading of trim values of the memory sub-system 110. In response to an operation request associated with a memory unit (e.g., a memory die) of the memory device 130, 140, the trim loading component 113 can refer to the one or more data structures to identify a set of trims associated with the requested operation. The trim loading component 113 can load the identified set of trims to a register of the memory die to enable execution of the requested operation.

In an embodiment, the trim loading component 113 can interrupt the sequential trim loading process in response to the requested operation. In an embodiment, following the loading of the trim values corresponding to the requested operation, the trim loading component 113 can resume the sequential trim loading process at a point in the sequence at which the sequential loading process was interrupted. In an embodiment, the trim loading component 113 can store an indication that a trim value has been loaded (e.g., a bit value of '0' can denote a trim value has not yet been loaded and a bit value of '1' can denote a trim value has been loaded) in the corresponding data structure. When the memory sub-system 110 returns to an idle state (e.g., following the completion of all requested operations), the trim loading component 113 can use the bit values stored in the data structure to identify and continue the loading of any unloaded trim values (e.g., trim values that have not been previously loaded as part of either the sequential loading process or in response to a requested operation).

Figure 2:
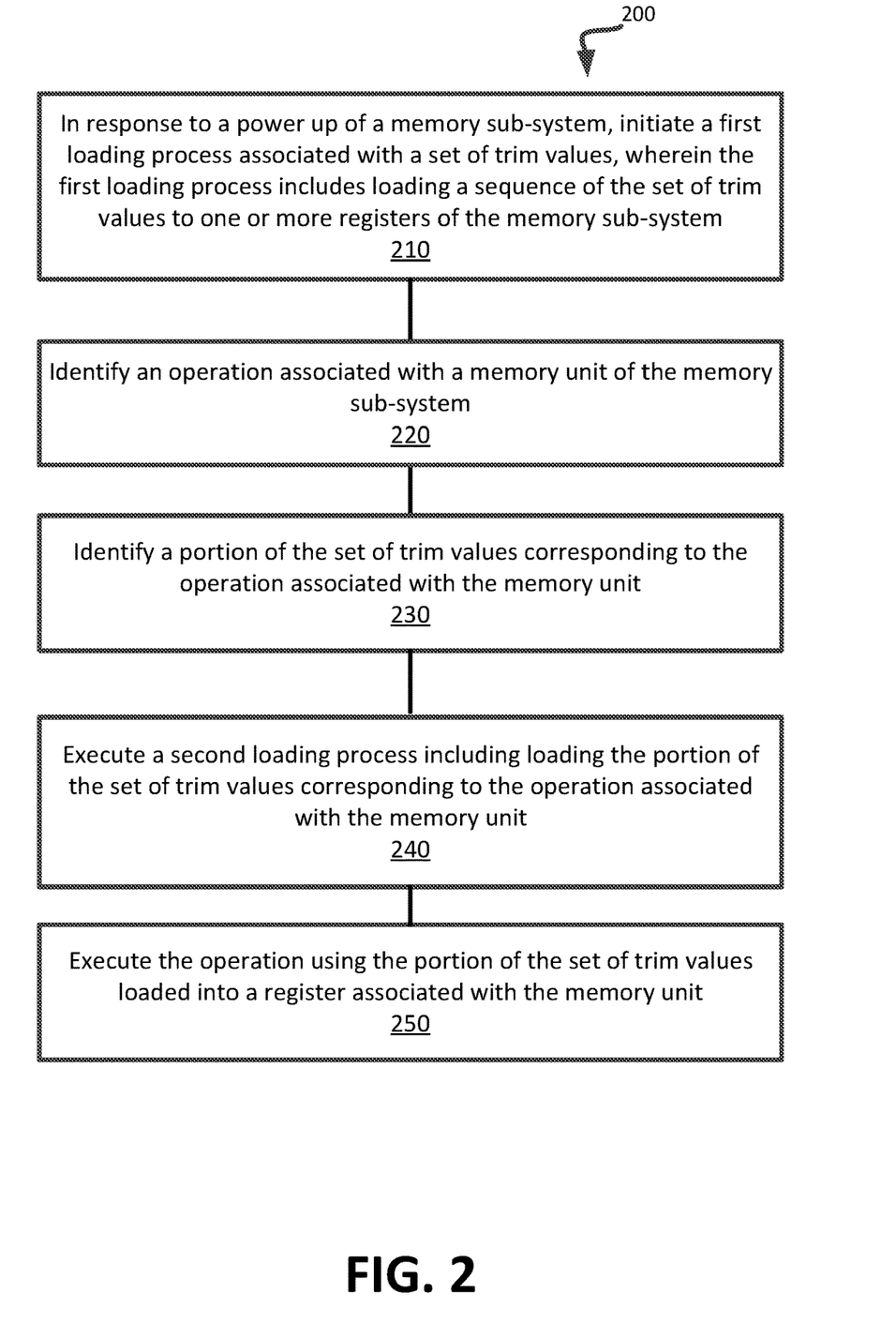
FIG. 2 is a flow diagram of an example method 200 of trim value loading management, in accordance with embodiments of the present disclosure.

FIG. 2 is a flow diagram of an example method 200 of managing a loading of trim values associated with a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the trim loading component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

In operation 210, in response to a power up of a memory sub-system, the processing logic (e.g., a processing device of the trim loading component 113 of FIG. 1) initiates a first loading process associated with a set of trim values, wherein the first loading process includes loading a sequence of the set of trim values to one or more registers of the memory sub-system. In an embodiment, the processing device can maintain one or more data structures (e.g., one or more tables) that identify the set of trim values (e.g., a complete set of the trim values associated with the memory sub-system). In an embodiment, each of the trims can be associated with a unique trim identifier (e.g., a sequence of numbers). In an embodiment, the processing logic can execute the first loading process by loading a first trim value in the sequence of the set of trim values, followed by a second trim value in the sequence of the set of trim values, followed by a third trim value in the sequence of the set of trim values, and so on.

Figure 4:
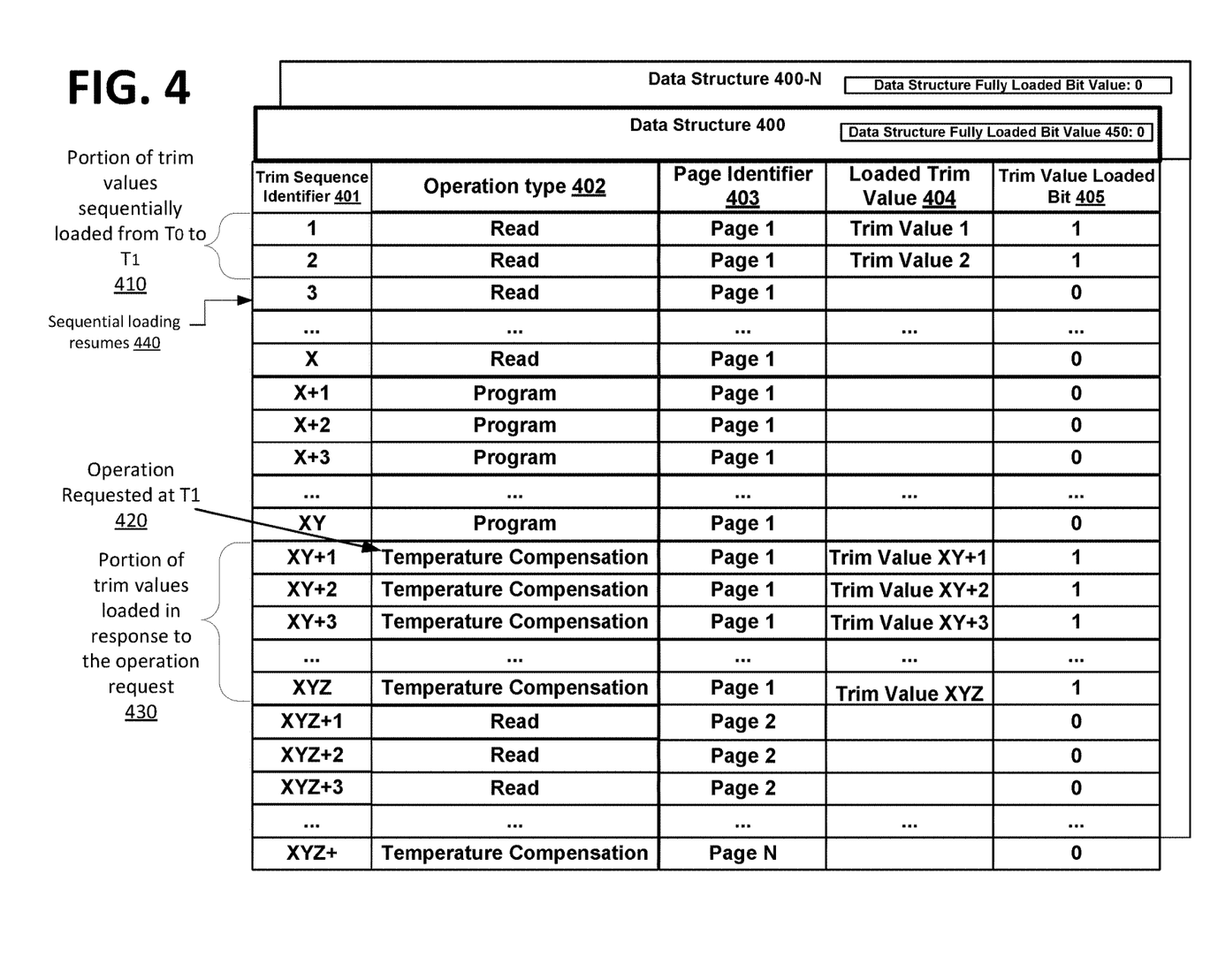
FIG. 4 illustrates an example set of data structures including information associated with trim identifiers corresponding to respective operations corresponding to memory units of a memory sub-system, in accordance with embodiments of the present disclosure.

FIG. 4 illustrates an example one or more data structures (e.g., data structure 400 . . . data structure 400-N) including information (e.g., metadata) associated with the set of trim values, in accordance with embodiments of the present disclosure. As shown in FIG. 4, each trim of the set of trim values is associated with a trim sequence identifier 401, an operation type 402 (e.g., read operation, program operation, temperature compensation operation, etc.), a page identifier 403, a loaded trim value 404 (for loaded trim values), and a trim value loaded bit 405 (e.g., a bit value of '0' indicating the trim value is not yet loaded or a bit value of '1' indicating the trim value has been loaded).

In an embodiment, in operation 210, upon power up of the memory sub-system, the processing logic can initiate the loading of the trim values in sequence based on the corresponding trim sequence identifier 401 at a time $T_0$.

In operation 220, the processing logic identifies an operation associated with a memory unit of the memory sub-system. In an embodiment, the memory unit can include a memory die, a memory page, a memory block, a block family, etc. of the memory sub-system. In an embodiment, the operation can be any operation for which trim values are loaded in order to execute the operation (e.g., a read operation, a program operation, a temperature compensation operation, etc.). In an embodiment, the operation can be initiated by a host system (e.g., host system 120 of FIG. 1) or by the memory sub-system at a time ($T_1$). In an embodiment, the processing logic identifies the type of operation (e.g., read operation, program operation, etc.) and the corresponding memory unit (e.g., memory page, memory die, etc.).

In operation 230, the processing logic identifies a portion of the set of trim values corresponding to the operation associated with the memory page. In an embodiment, the processing logic uses the one or more data structures to identify the portion or subset of the set of trim values associated with the requested operation. In an embodiment, the processing logic performs a look-up operation using the data structure based on the operation type and the identified memory unit.

For example, with reference to FIG. 4, the requested operation is a temperature compensation operation associated with memory page 1 received at time $T_1$. As shown in FIG. 4, the processing logic can identify the portion of trim values (e.g., trims associated with trim sequence identifiers XY+1 through XYZ) that need to be loaded to execute the requested temperature compensation operation associated with page 1.

In operation 240, the processing logic executes a second loading process including loading the portion of the set of trim values corresponding to the operation associated with the memory unit. In an embodiment, the processing logic interrupts the first loading processing (e.g., the sequential loading of the unloaded trim values) and executes the second loading process of the identified portion of trim values. In the example shown in FIG. 4, the processing logic interrupts the first loading process after loading the trim values for trim sequence identifier 1 and trim sequence identifier 2 and executes the loading of the portion of trim values in response to the operation request 430. In an embodiment, following the loading of the identified portion of the trim values, the trim value loaded bit 405 associated with those trim values can be set to '1' to indicate the corresponding trim values have been loaded. Advantageously, as the processing logic resumes the sequential loading of the trim values, the trim value loaded bit 450 can be checked and the loading can be skipped if the bit value is '1'.

In operation 250, the processing logic executes the operation using the portion of the set of trim values loaded into a register associated with the memory unit. In an embodiment, following execution of the requested operation, the processing logic can identify a return to an idle state (e.g., where there are no outstanding operations to be executed) and return to the first loading process and sequentially load the trim values. In the example shown in FIG. 4, the processing logic can resume the first loading process (e.g., the sequential loading process 430) starting with the loading of trim sequence identifier 3.

Figure 3:
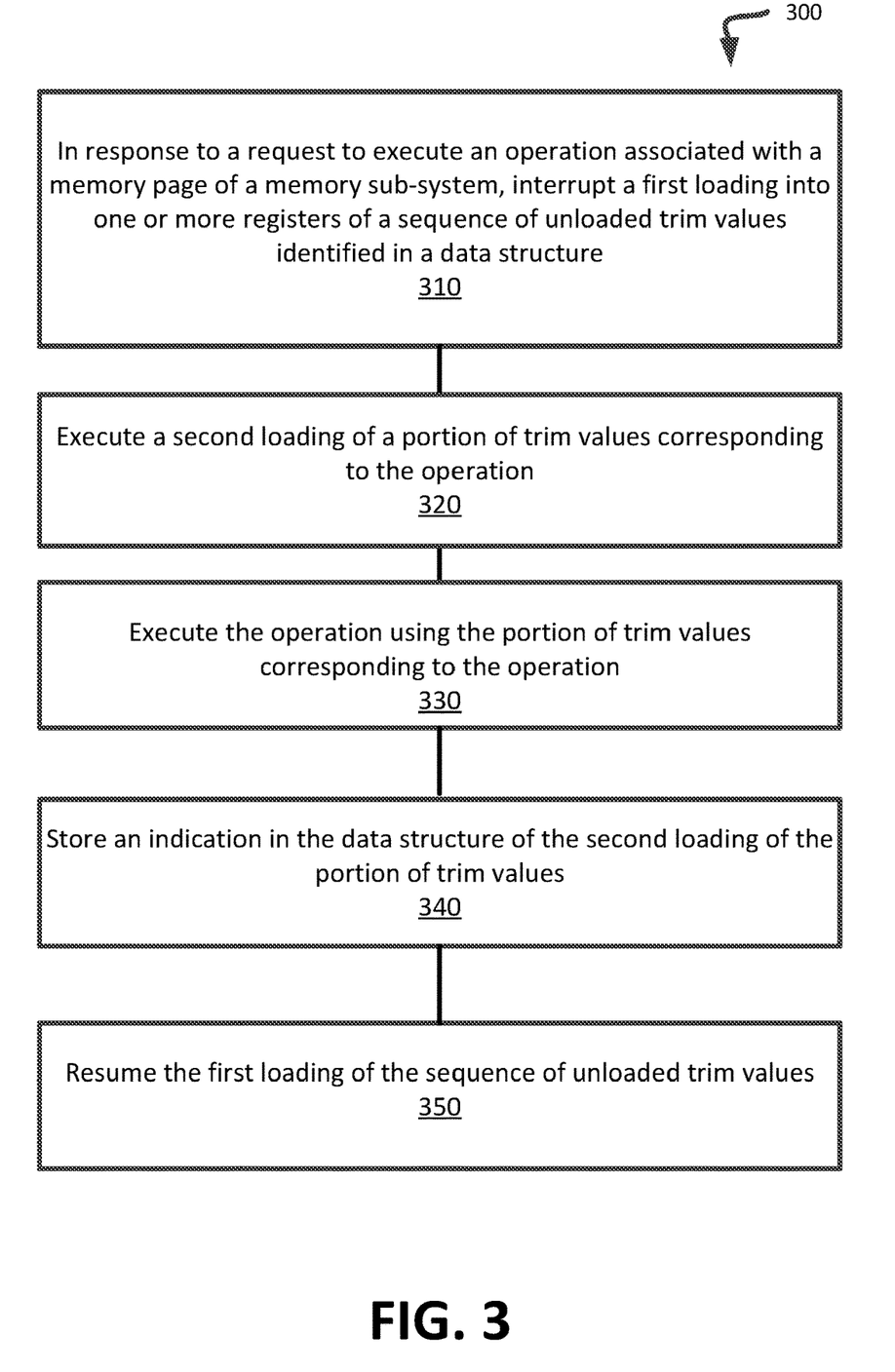
FIG. 3 is a flow diagram of an example method 300 of trim value loading including management of one or more data structures, in accordance with embodiments of the present disclosure.

FIG. 3 is a flow diagram of an example method 300 of managing a trim loading process associated with a memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the trim loading component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

In operation 310, in response to a request to execute an operation associated with a memory page of a memory sub-system, the processing logic interrupts a first loading into one or more registers of a sequence of unloaded trim values identified in a data structure. In an embodiment, the processing logic initiates the first loading (e.g., a sequential loading of a complete set of trim values) in response to a power on event associated with the memory sub-system. In an embodiment, the one or more data structures (e.g., data structure 400 through data structure 400-N of FIG. 4) store metadata associated with the trim values to be loaded upon powering up the memory sub-system. In an embodiment, upon identification of a request to execute the operation (e.g., a host-initiated or memory sub-system-initiated request), the processing logic interrupts or pauses the first loading (e.g., sequential loading) of the unloaded trim values.

In operation 320, the processing logic executes a second loading of a portion of trim values corresponding to the operation. In an embodiment, the processing logic uses the one or more data structures to identify the portion of the trim values that correspond to the operation (e.g., unloaded trim values that need to be loaded to execute the operation). For example, as shown in FIG. 4, the data structure can store metadata identifying multiple different combinations of operation types 402 and page identifiers 403 to enable the processing logic to identify corresponding trim values (e.g., by trim sequence identifier 401) that are to be loaded to execute the requested operation type on the associated memory page. For example, as shown in FIG. 4, trims 1 through X correspond to a read operation of page 1, trims X+1 through XY correspond to a program operation of page 1, trims XY+1 through XYZ correspond to a temperature compensation operation of page 1, and so on. If, for example, the requested operation is a temperature compensation operation of page 1, the processing logic performs the second loading to load trim values for trim sequence identifiers XY+1 through XYZ (e.g., the portion of trim values that are to be loaded to execute the requested operation type on the associated memory page).

In operation 330, the processing logic executes the operation using the portion of trim values corresponding to the operation. In the example described above in connection with FIG. 4, the processing executes the temperature compensation operation associated with memory page 1 using the loaded trim values for trim sequence identifiers XY+1 through XYZ.

In operation 340, the processing logic stores an indication in the data structure of the second loading of the portion of trim values. In an embodiment, the processing logic sets a bit corresponding to each of the trim values that were loaded as part of the second loading. For example, as shown in FIG. 4, the processing logic sets the trim value loaded bit 405 to a value of '1' to indicate the corresponding trim value has been loaded. In the example described above, the processing logic stores the indication (e.g., sets the trim value loaded bit to '1') for trim sequence identifiers XY+1 through XYZ following the completion of the second loading.

In operation 350, the processing logic resumes the first loading of the sequence of unloaded trim values. In an embodiment, the processing logic uses the data structure to identify a location within the trim sequence where the first loading was interrupted due to the operation request. For example, as shown in FIG. 4, the first loading of the sequence of unloaded trim values resulted in the loading of trim sequence identifiers 1 and 2, as indicated by the trim value loaded bit being set to '1'. In an embodiment, the processing logic resumes the first loading of the sequence of unloaded trim values by identifying a next trim sequence identifier in the sequence that has a trim value loaded bit 430 of '0', indicating that it has not yet been loaded. Accordingly, in the example shown in FIG. 4, the first loading (e.g., the sequential loading) resumes 440 at trim sequence identifier 3. In an embodiment, during the execution of the first loading of the sequence of unloaded trim values, the processing device can skip all trim values that were previously loaded (e.g., in connection with the execution of an operation) as denoted by the trim value loaded bit 405 of '1'. In an embodiment, the first loading is resumed by the processing logic to load, in sequence, only the trim values that have a trim value loaded bit 405 of '0'. In an embodiment, the trim loading component 113 can maintain a bit value representing whether an entire set of trim values stored in a data structure have been loaded. As shown in FIG. 4, the data structure fully loaded bit value 450 can be set to toggle from a value of '0' to a value of '1' upon completion of the loading of all of the trim values stored in a data structure.

Figure 5:
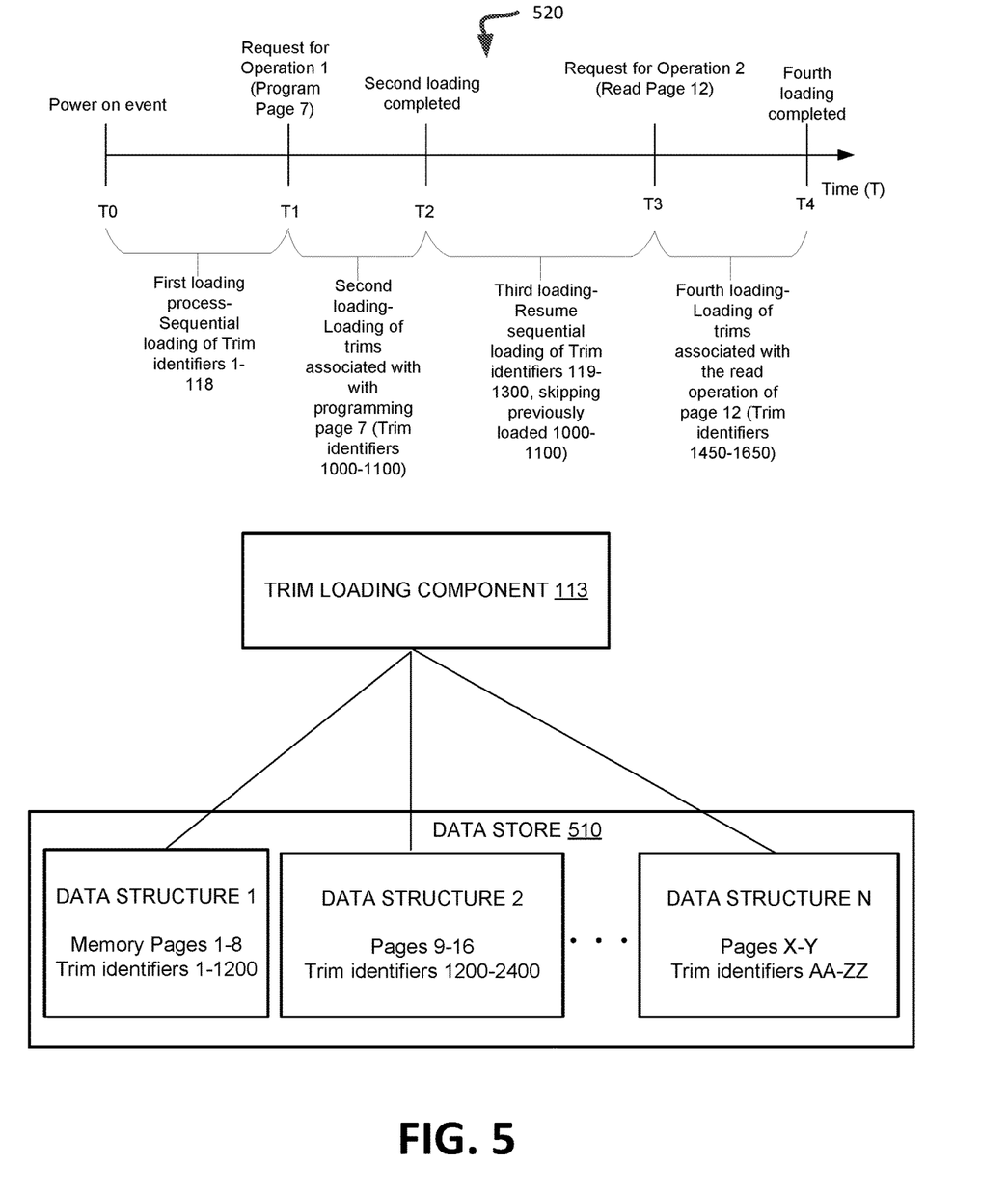
FIG. 5 illustrates an example trim loading component using a set of data structures to manage trim value loading on example timeline, in accordance with embodiments of the present disclosure.

FIG. 5 schematically illustrates an example trim loading component 113 managing trim loading processing associated with a memory sub-system. As shown in FIG. 5, the trim loading component 113 interacts with a data store 510 including multiple data structures (e.g., data structure 1 through data structure N) each storing metadata associated with trim values corresponding to various operations and multiple memory pages of the memory sub-system. For example, as shown in FIG. 5, data structure 1 is configured to store metadata relating to memory pages 1-8 and trim identifiers 1-1200 which correspond to a set of operations (e.g., read operation, program operation, temperature compensation operation, etc.) associated with memory pages 1-8.

FIG. 5 further illustrates an example timeline 520 illustrating various operations performed by the trim loading component 113 as part of the managed trim loading process, in accordance with embodiments of the present disclosure. In the example shown, at time $T_0$, the trim loading component 113 identifies a power on event and initiates a first loading process. In an embodiment, the first loading process includes the sequential loading of the trim values associated with the memory sub-system (e.g., trim identifiers 1 through ZZ). In the example shown, the trim loading component 113 loads trim identifiers 1-118 in a period between $T_0$ and $T_1$.

At $T_1$, a request for operation 1 is identified by the trim loading component 113. In this example, operation 1 is a program operation associated with memory page 7. As shown in FIG. 5, information associated with the trim values needed to execute the program operation associated with memory page 7 are stored in data structure 1. At $T_1$, the trim loading component 113 interrupts the first loading process and initiates a second loading process to load the trim values associated with the programming of page 7 (e.g., trim identifiers 1000-1100).

At $T_2$, the second loading is completed and a third loading is initiated. In an embodiment, the third loading includes resuming the sequential loading of trim identifiers (e.g., resuming the loading executed during $T_0$ to $T_1$). As shown in the example, during a period between $T_2$ and $T_3$, the trim loading component 113, the third loading process including loading trim identifiers 119-1300, skipping previously loaded trim identifiers 1000-1100. In an embodiment, an indication is stored in data structure 1 that trim identifiers 1000-1100 were previously loaded in connection with the execution of the programming of page 7.

At $T_3$, the third loading is interrupted in view of a request for operation 2. In this example, operation 2 includes a read operation of page 12. In response to the request for operation 2, the trim loading component 113 initiates a fourth loading process including the loading of trim values associated with the read operation of page 12. In an embodiment, the trim loading component 113 executes a look-up operation using data structure 2 to identify the trim values to load for the execution of the program operation of page 12 (e.g., trim identifiers 1450-1650). During a time period between $T_3$ and $T_4$, the trim loading component 113 loads the identified trim values and executes operation 2. In an embodiment, at $T_4$, the trim loading component 113 can resume the sequential loading of the trim identifiers, skipping any previously loaded trim values, until all of the trim values (e.g., trim identifiers 1-ZZ) are loaded.

Figure 6:
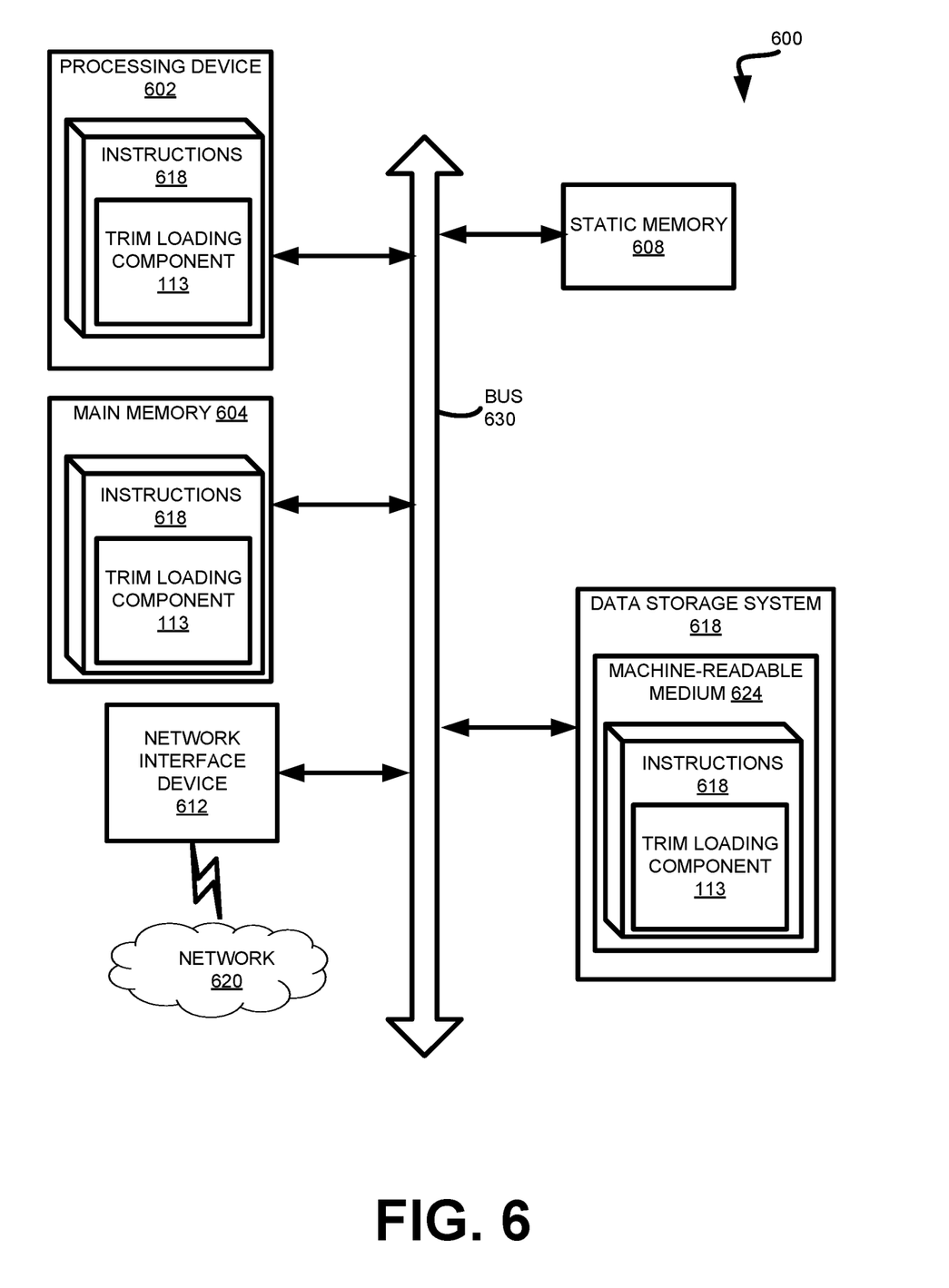
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the trim loading component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 610 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 628 for performing the operations and steps discussed herein. The computer system 600 can further include a network interface device 612 to communicate over the network 620.

The data storage system 618 can include a machine-readable storage medium 624 (also known as a computer-readable medium) on which is stored one or more sets of instructions 628 or software embodying any one or more of the methodologies or functions described herein. The instructions 628 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 628 include instructions to implement functionality corresponding to the trim loading component 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
in response to a power up of a memory sub-system, initiating, by a processing device, a first loading process to load a sequence of a set of trim values to one or more registers of the memory sub-system;
during execution of the first loading process, identifying an operation request associated with a memory unit of the memory sub-system;
in response to the operation request, interrupting the first loading process, wherein the first loading process results in a loading of a first portion of the sequence of the set of trim values at a time of the interrupting;
identifying a portion of the set of trim values corresponding to the operation request associated with the memory unit;
executing a second loading process comprising loading the portion of the set of trim values corresponding to the operation request associated with the memory unit;
executing an operation using the portion of the set of trim values loaded into the one or more registers associated with the memory unit during the second loading process; and
following execution of the operation, resuming the first loading process to load a second portion of the sequence of the set of trim values to one or more registers of the memory sub-system, the second portion comprising one or more unloaded trim values of the sequence of trim values.

2. The method of claim 1, further comprising storing, in a data structure, an indication identifying the first portion of the sequence of the set of trim values that were loaded to the one or more registers prior to the interrupting of the first loading process.

3. The method of claim 1, further comprising executing a look-up operation using one or more data structures comprising information identifying the portion of the set of trim values corresponding to the operation.

4. The method of claim 1, further comprising identifying a subsequent operation associated with another memory unit of the memory sub-system.

5. The method of claim 4, further comprising:
interrupting the resuming of the first loading process;
identifying a third portion of the set of trim values corresponding to the subsequent operation associated with the memory unit; and
executing a further loading process comprising loading the third portion of the set of trim values corresponding to the subsequent operation.

6. The method of claim 5, further comprising:
executing the subsequent operation using the third portion of the set of trim values; and
following executing of the subsequent operation, resuming the first loading process.

7. A system comprising:
a memory device; and
a processing device, operatively coupled to the memory device, the processing device to perform operations comprising:
in response to a power up of the memory device, initiating a first loading to load a sequence of a set of trim values to one or more registers;
in response to a request to execute an operation associated with a memory page of the memory device, interrupting the first loading of the sequence of trim values;
executing a second loading of a first portion of trim values corresponding to the operation;
executing the operation using the first portion of trim values corresponding to the operation;
storing an indication in a data structure of the second loading of the first portion of trim values; and
resuming the first loading of the sequence of trim values.

8. The system of claim 7, wherein the indication comprises a bit value associated with a set of trim identifiers associated with the first portion of trim values.

9. The system of claim 8, the operations further comprising skipping, during resumption of the first loading, a loading of previously loaded trim values.

10. The system of claim 7, further comprising identifying a first set of one or more trim values in the sequence that were loaded during the first loading.

11. The system of claim 10, the operations further comprising identifying a portion of one or more trim values in the sequence that were not loaded in the first loading, wherein the portion of one or more trim values are loaded upon resuming the first loading.

12. The system of claim 7, wherein the data structure comprise information identifying plurality of portions of trim values, wherein each portion of trim values corresponds to an operation and a memory page.

13. A non-transitory computer readable medium comprising instructions, which when executed by a processing device, cause the processing device to perform operations comprising:
   in response to a power up of a memory sub-system, initiating, by a processing device, a first loading process to load a sequence of a set of trim values to one or more registers of the memory sub-system;
   during execution of the first loading process, identifying an operation request associated with a memory unit of the memory sub-system;
   in response to the operation request, interrupting the first loading process, wherein the first loading process results in a loading of a first portion of the sequence of the set of trim values at a time of the interrupting;
   identifying a portion of the set of trim values corresponding to the operation request associated with the memory unit;
   executing a second loading process comprising loading the portion of the set of trim values corresponding to the operation request associated with the memory unit;
   executing an operation using the portion of the set of trim values loaded into the one or more registers associated with the memory unit during the second loading process; and
   following execution of the operation, resuming the first loading process to load a second portion of the sequence of the set of trim values to one or more registers of the memory sub-system, the second portion comprising one or more unloaded trim values of the sequence of trim values.

14. The non-transitory computer readable medium of claim 13, the operations further comprising storing, in a data structure, an indication identifying the first portion of the sequence of the set of trim values that were loaded to the one or more registers prior to the interrupting of the first loading process.

15. The non-transitory computer readable medium of claim 14, the operations further comprising identifying a subsequent operation associated with another memory unit of the memory sub-system.

16. The non-transitory computer readable medium of claim 15, the operations further comprising:
   interrupting the resuming of the first loading process;
   identifying a third portion of the set of trim values corresponding to the subsequent operation associated with the memory unit; and
   executing a further loading process comprising loading the third portion of the set of trim values corresponding to the subsequent operation.

17. The non-transitory computer readable medium of claim 16, the operations further comprising:
   executing the subsequent operation using the third portion of the set of trim values; and
   following executing of the subsequent operation, resuming the first loading process.

18. The non-transitory computer readable medium of claim 13, the operations further comprising executing a look-up operation using one or more data structures comprising information identifying the portion of the set of trim values corresponding to the operation.

* * * * *